United States Patent
Shachar et al.

(10) Patent No.: US 7,660,326 B2
(45) Date of Patent: *Feb. 9, 2010

(54) ENHANCED RESERVATION BASED MEDIA ACCESS CONTROL FOR DYNAMIC NETWORKS AND SWITCH-FABRICS

(75) Inventors: Shlomo Shachar, Givatayim (IL); Oren Moshe, Givatayim (IL)

(73) Assignee: Matisse Networks, Inc., Mountain View, CA (US)

( * ) Notice: Subject to any disclaimer, the term of this patent is extended or adjusted under 35 U.S.C. 154(b) by 859 days.

This patent is subject to a terminal disclaimer.

(21) Appl. No.: 10/632,835

(22) Filed: Aug. 4, 2003

(65) Prior Publication Data
US 2004/0037301 A1    Feb. 26, 2004

Related U.S. Application Data

(63) Continuation-in-part of application No. 10/157,871, filed on May 31, 2002, now Pat. No. 7,009,991.

(60) Provisional application No. 60/367,786, filed on Mar. 28, 2002.

(51) Int. Cl.
*H04L 12/42* (2006.01)
*H04J 3/16* (2006.01)

(52) U.S. Cl. .................................. 370/458; 370/468

(58) Field of Classification Search .............. 370/458, 370/468
See application file for complete search history.

(56) References Cited

U.S. PATENT DOCUMENTS

| | | | |
|---|---|---|---|
| 5,191,626 A | 3/1993 | Stern | |
| 5,500,857 A * | 3/1996 | Nakata | 370/440 |
| 5,696,903 A | 12/1997 | Mahany | |
| 5,880,864 A * | 3/1999 | Williams et al. | 398/71 |
| 6,415,312 B1 | 7/2002 | Boivie | |
| 6,477,288 B1 | 11/2002 | Sato | |
| 6,480,495 B1 * | 11/2002 | Mauger et al. | 370/395.65 |
| 6,502,140 B1 | 12/2002 | Boivie | |

(Continued)

FOREIGN PATENT DOCUMENTS

GB     2 282 018 A     3/1995

OTHER PUBLICATIONS

"A New Approach to the Maximum-Flow Problem", Goldberg et al, Journal of the Association for Computing Machinery, vol. 35, No. 4, Oct. 1988, pp. 921-940.

(Continued)

*Primary Examiner*—Andrew Lee
(74) *Attorney, Agent, or Firm*—Squire, Sanders & Dempsey, LLP

(57) ABSTRACT

A communications node for an optical network is disclosed. The node includes a tunable wavelength receiver for receiving optical data from source nodes at a plurality of source wavelengths and a tunable wavelength transmitter for transmitting optical data to destination nodes at a plurality of destination wavelengths. The node also includes a media access controller which creates at least one reservation map for reserving time slots and wavelengths for transmitting data to and receiving data from a plurality of nodes, made up of the source nodes and destination nodes, based upon available time slots and wavelengths in the optical network, the reservation map being based upon demand data or other data from the plurality of nodes.

40 Claims, 11 Drawing Sheets

U.S. PATENT DOCUMENTS

| | | | |
|---|---|---|---|
| 6,680,912 B1 | 1/2004 | Kalman et al. | |
| 6,816,500 B1* | 11/2004 | Mannette et al. | 370/431 |
| 6,925,259 B2* | 8/2005 | Boroditsky et al. | 398/75 |
| 7,085,494 B2* | 8/2006 | Boroditsky et al. | 398/49 |

OTHER PUBLICATIONS

"Open Shop Scheduling to Minimize Finish Time", Gonzalez et al, Journal of the Association for Computing Machinery, vol. 23, No. 4, Oct. 1976, pp. 665-679.

"SR$^3$: A Bandwidth-Reservation MAC Protocol for Multimedia Applications over All-Optical WDM Multi-Rings", Marsan et al, IEEE, 1997.

Hornet, "Hybrid Opto-Electronic Ring Network" website, http://ocrl.stanford.edu/hornet/hornet.html, dated Feb. 4, 2002, pp. 1-3.

Ganz et al., "A Time-Wavelength Assignment Algorithm for a WDM Star Network,"Infocom, pp. 2144-2150, 1992.

Kang et al., "A Broadband Ring Network: Multichannel Optical Slotted Ring," Computer Networks and ISDN Systems, vol. 27, pp. 1387-1398, 1995.

Bo Wen and Krishna M. Sivalingam, "Routing, Wavelength and Time-Slot Assignment in Time Division Multiplexed Wavelength-Routed Optical WDM Networks," IEEE INFOCOM, 2002, pp. 1442-1450.

R. Srinivasan and Arun K. Somani, "A Generalized Framework for Analyzing Time-Space Switched Optical Networks," IEEE Journal on Selected Areas in Communications, vol. 20, No. 1, Jan. 2002, pp. 202-215.

Resit Sendag, et al., "Routing and Wavelength Assignment in Optical Passive Star Networks with Non-Uniform Traffic Load," IEEE, 2001, pp. 1435-1439.

Viktoria Elek, et al., "Photonic Slot Routing: A Cost-Effective Approach to Designing All-Optical Access and Metro Networks," IEEE Communications Magazine, Nov. 2001, pp. 164-171.

* cited by examiner

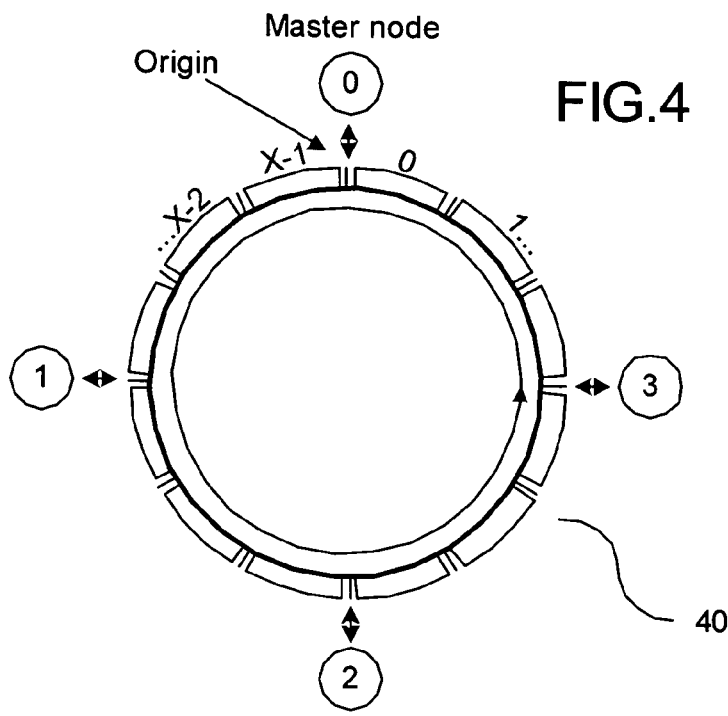
FIG.4
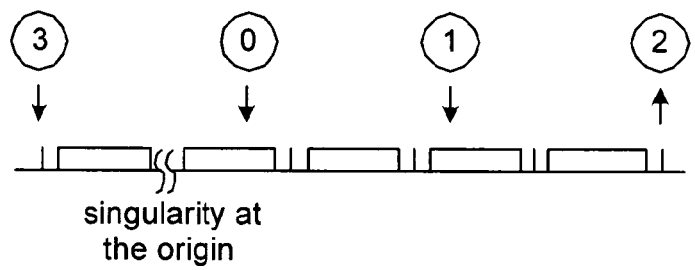
FIG.5
singularity at
the origin
FIG.6
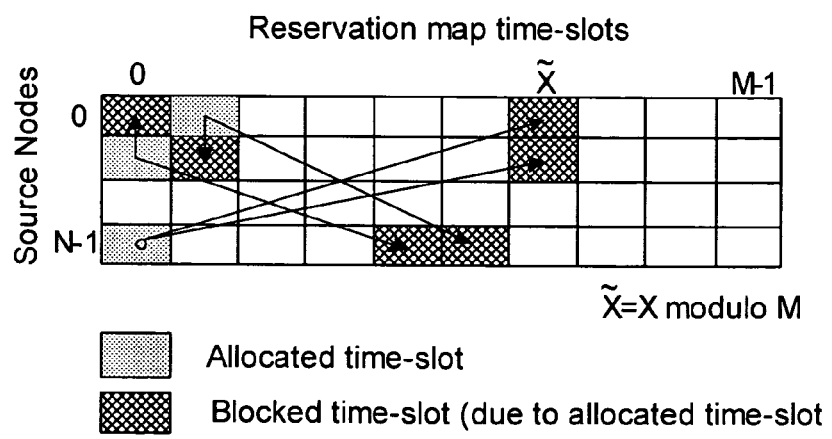

Fiber Cut

Node Transmitting slot clock

ENHANCED RESERVATION BASED MEDIA ACCESS CONTROL FOR DYNAMIC NETWORKS AND SWITCH-FABRICS

REFERENCE TO RELATED APPLICATIONS

This is a continuation-in-part of application Ser. No. 10/157,871, filed May 31, 2002 now U.S. Pat. No. 7,009,991, entitled Reservation-Based Media Access Controller and Reservation-Based Optical Network, where that application claims priority of U.S. Provisional Patent Application Ser. No. 60/367,786, filed on Mar. 28, 2002. The contents of the above applications are hereby incorporated by reference.

BACKGROUND OF THE INVENTION

1. Field of Invention

The present invention relates to optical networks, such as MAN (metropolitan area networks), SAN (storage area networks), access optical networks, and enterprise networks. The invention further relates to optical networks and optical fabric-switches. In particular, the invention relates to various implementations of a reservation based Media Access Control (MAC) network/switch fabric.

2. Description of Related Art

Fiber-optic infrastructure is a vital part of today's rapidly changing worldwide networks. The drive for interconnectivity as well as the exponential growth in data traffic as a result of new applications leads to the adoption of new optical solutions. Carriers and service providers are looking to increase their revenue by deliver new services such as storage area networks (SAN) and IP based services to customers. Similar to that, enterprises are looking to enhance their enterprise area networks to supply the bandwidth demands to the increasing needs. Technologies are needed that can leverage existing networks as well as increase the economic viability of new network applications. Recent advances in optical technologies (such as wavelength division multiplexing, tunable lasers, tunable receivers, and high-speed optical/electronic components) have led to new developments in the optical networks area.

The traditional optical networks were mainly used in the long-haul area networks; however, new optical networks are being introduced in the regional, metropolitan, access and enterprise area networks. The new optical networks, whether they are built as an all-optical network or as a central network with optical switch fabrics, are facing different demands. Optical networks require sustaining high bandwidth while maintaining mesh connectivity and supporting multiple services and multiple classes of service. For example, metropolitan area networks (MANs) can transport voice traffic, SAN traffic and IP traffic. Voice traffic demands low bandwidth with guaranteed latency, while IP traffic is burst traffic and requires large bandwidth. Switch fabrics, which are the core of the network switches/routers, are required to support low latency, while sustaining high bandwidth and many ports.

All optical networks or switch fabrics are basically packet-switched; in other words, routing of packets from a source optical element to a destination optical element is done optically, without the need for optical-electrical conversions outside the source and destination optical elements.

A sub-group of the all-optical networks/fabric-switches is the all-optical multi-ring. All-optical multi-ring networks/fabric-switches are based on a fiber ring topology, in which the fiber-ring is a shared optical medium. The network/fabric-switch nodes (optical elements), located around the fiber-ring, are equipped with either a tunable optical receiver or with a tunable transmitter or with a tunable receiver and transmitter. An addition sub-group of the all-optical networks/fabric-switches is the all-optical star coupled. All-optical star coupled networks/fabric-switches are based on an optical star coupler to which all the optical elements are connected. Nodes, connected to the coupler, are equipped with either tunable optical receiver or with tunable transmitter or with tunable receiver and transmitter.

Many such prior art networks are referred to as synchronous and slotted networks, where the fiber ring is essentially divided into a plurality of time slots, with the time slots rotating uni-directionally around the ring. In some cases, two rings can be used with each node transmitting the same data on each ring, but in opposite directions. Nodes can transmit a packet only within the boundaries of a time slot. The length of the time slot is typically fixed. Scheduling of packets is typically performed through the scheduling of wavelengths and time slots. In order to avoid collisions in time slots, only one node can transmit on each wavelength. Once a time slot has a packet at a particular wavelength, no other node can transmit in that time slot at that wavelength thereby freeing the wavelengths at that time slot.

The MMR and the SRR works (By Marco Ajmone Marsan, Andrea Bianco, Emilio Leonardi, A. Morabito, and Fabio Neri) deal with a slotted all-optical multi-ring topology. The MAC algorithm presented in these works is based on carrier-sense ability of each node and a fairness algorithm to prevent nodes starvation. The carrier-sense feature gives the network the ability to adapt transmission resources according to the traffic. Thus, the network bandwidth can be used more optimally. However, this approach has also a drawback that the algorithm lacks the ability to reserve bandwidth; consequently, the network does not support constant bit-rate traffic.

One version of this issue was being dealt in the $SR^3$ algorithm developed by the same authors ("$SR^3$: A Bandwidth-Reservation MAC Protocol for Multimedia Applications over All-Optical WDM Multi-Rings", Marco Ajmone Marsan, Andrea Bianco, Emilio Leonardi, A. Morabito, Fabio Neri). The $SR^3$ algorithm is also based on the carrier-sense idea with additional capability of reserving bandwidth between two nodes. The reserve bandwidth between from source node to a specific destination node can be up to 1/N of the bandwidth (N is the number of nodes). Although the $SR^3$ algorithm supports reservation and thus supports constant bit-rate traffic, the reservation limitation, which increases as the number of the nodes increases, limits the bandwidth that can be allocated to constant bit-rate traffic. Furthermore the carrier-sense approach requires a fairness algorithm in order to avoid node starvations. The fairness algorithm base on the SAT token can cause large delays. The delays created by the fairness algorithm causes that a fairness-based networks cannot transport delay sensitive traffic, such as voice/video traffic. In order to improve the fairness algorithm and minimize the delays an improved fairness algorithm was proposed by I. Cidon, L. Georgiadis, R. Guerin, and Y. Shavitt ("Improved Fairness Algorithm for Rings with Spatial Reuse").

SUMMARY OF THE INVENTION

The present invention is therefore directed to a communications node for optical networks/fiber-switches. The node includes a tunable wavelength receiver for receiving optical data from source nodes at a plurality of source wavelengths and a tunable wavelength transmitter for transmitting optical data to destination nodes at a plurality of destination wavelengths. The node also includes a media access controller (MAC). The media access controller creates at least one reservation map for reserving time slots and wavelengths for transmitting data to and receiving data from a plurality of nodes. The reservation map is made up of the source nodes and destination nodes. It is created using available time slots and wavelengths in the optical medium, and using demand data from the plurality of nodes. In addition, the reservation map can be set using reservation map data transmitted from another of the plurality of nodes.

The invention is also directed to embodiments wherein the communication node includes a demand matrix generating unit for generating a demand matrix based upon demand data from the plurality of nodes, and wherein the reservation map is based upon the demand matrix. In addition, the reservation map may be created based upon demand matrix data transmitted from another of the plurality of nodes. Additionally, communication node may be configured for operation with an optical fiber-ring or star coupled topology. Also, the tunable wavelength receiver may be optimized with other tunable wavelength receivers of other communications nodes of the optical network, such that the tunable wavelength receiver and the other tunable wavelength receivers are tuned to a common wavelength to receive multicast or broadcast transmissions.

The invention is also directed to a media access controller for a network, having a demand matrix unit for generating a demand matrix based upon bandwidth requirements for node-to-node communication and a reservation map unit for creating a reservation map based upon the demand matrix, and based upon allocation constraints for time slots and wavelengths in a reservation frame. The reservation map unit utilizes maximum matching data for communication among a plurality of nodes on the network and generates at least one of a reception reservation map and a transmission reservation map. In addition, the reception and transmission reservation maps can be set using reservation maps data transmitted from another of the plurality of nodes.

The invention is also directed to a communications node for an optical network, having a receiver for receiving optical data from source nodes, a transmitter for transmitting optical data to destination nodes and a media access controller which determines a time slot clock based on a system clock signal. The receiver is of a first type that is one of a fixed wavelength type and a tunable wavelength type. The transmitter is of a second type that is one of the fixed wavelength type and the tunable wavelength type. The first and second types are not the same, and at least one of the receiver and the transmitter uses the time slot clock to determine a time slot in which the optical data is to be transmitted or is to be received.

The present invention is also directed to embodiments encompassing a method for communicating optical data on an optical network. The method includes the steps of receiving optical data from source nodes at a plurality of source wavelengths at a tunable wavelength receiver and transmitting optical data to destination nodes at a plurality of destination wavelengths from a tunable wavelength transmitter. The method also includes controlling the tunable wavelength receiver and the tunable wavelength transmitter, via a media access controller by creating at least one reservation map for reserving time slots and wavelengths for transmitting data to and receiving data from a plurality of nodes of the optical network, based upon available time slots and wavelengths, the reservation map being based upon demand data from the plurality of nodes.

The invention is also directed to systems including the various means for performing the methods and implementing the elements discussed above.

BRIEF DESCRIPTION OF THE DRAWINGS

For proper understanding of the invention, reference should be made to the accompanying drawings, wherein:

FIG. 4 illustrates time-slots and nodes around the ring;

FIG. 5 illustrates a single wavelength path for an optical network;

FIG. 6 illustrates a dependent reservation map according to the invention;

DETAILED DESCRIPTION OF PREFERRED EMBODIMENTS

Figure 1A:
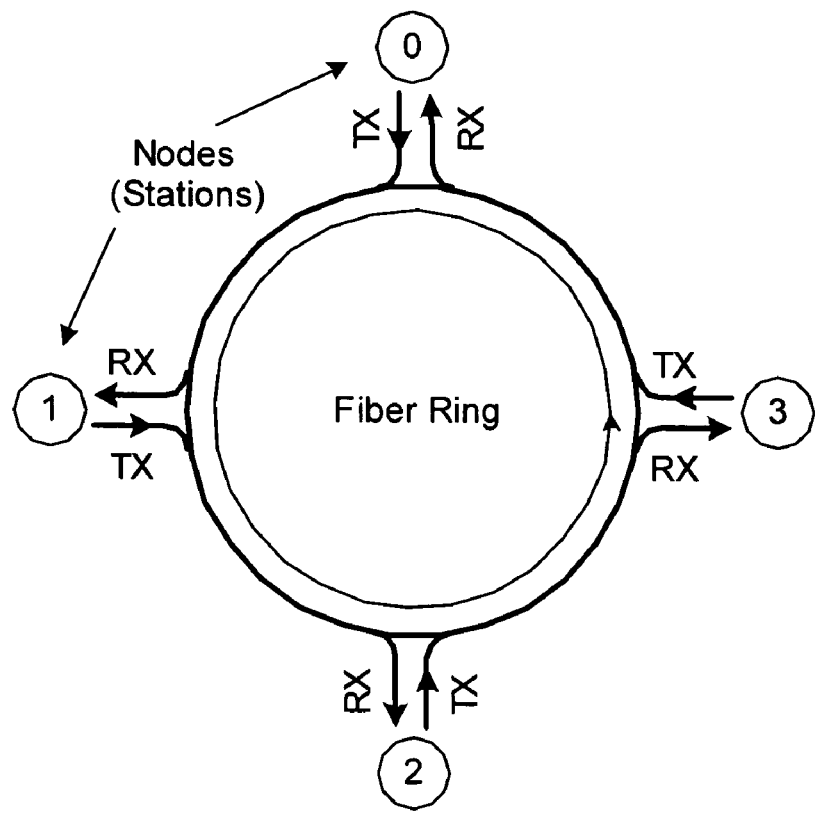
FIG. 1A illustrates an optical fiber network having a plurality of nodes, according to one embodiment of the present invention.
Figure 1B:
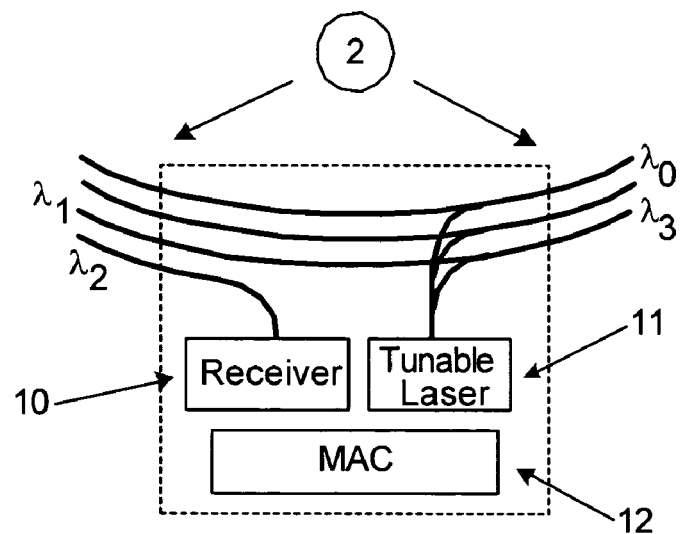
FIG. 1B illustrates a receiver, tunable laser, and MAC as provided in each node, according to one embodiment of the present invention.

The invention is therefore directed to a system and method for all-optical network/fabric-switch, in which nodes are equipped with ultra-fast tunable laser transmitter 11 and a fixed receiver 10, as shown in FIG. 1. In addition the invention defines any one of the nodes as a master-node, or origin-node. The master-node can be any of the network nodes, and may perform additional tasks such as clock distribution and reservation algorithm execution within MAC 12.

Figure 2:
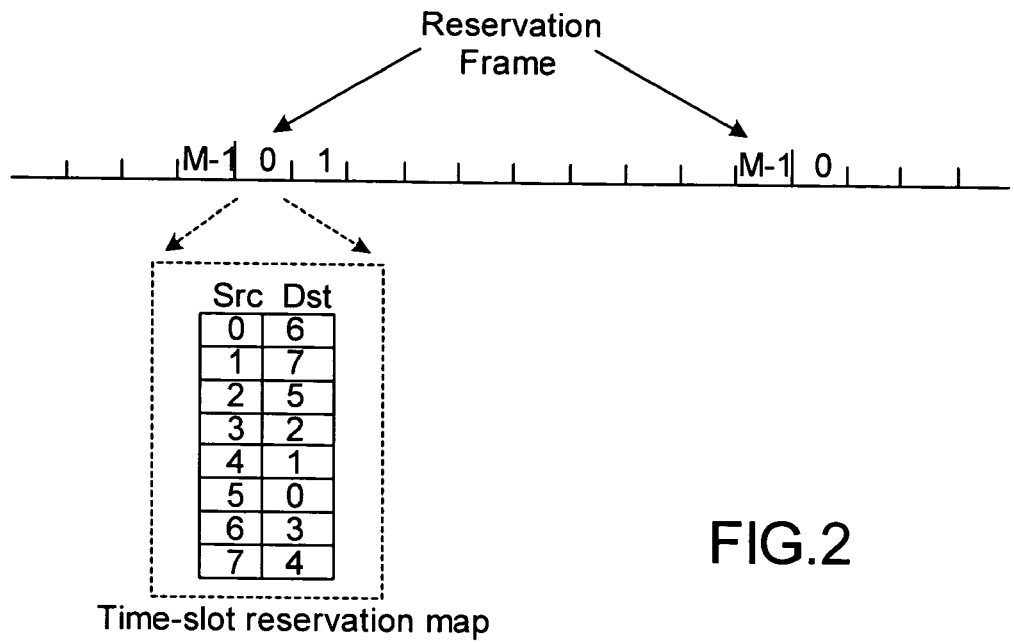
FIG. 2 illustrates a reservation frame and a time-slot reservation map.

The all-optical fiber-ring topology enables to establish up to N connections simultaneously, wherein N equals the number of nodes or/and wavelengths. In order to maximize the number of connections, a collision free MAC should be used. The MAC uses a reservation mechanism, in which a set of connections is predefined for each time-slot. The connection set is defined in a way that collisions do not occur, i.e. two nodes do not transmit in same wavelength at the same time-slot. Generally, a reservation based MAC requires that time-slots will be tagged. This way all nodes will associate the same time-slots with the same reservation. The MAC tags time-slots with incremented numbers from 0 to M−1 repeatedly. M continuous time-slots (from 0 to M−1) form a reservation frame as illustrated in FIG. 2. All time-slots with the same tag number have the same reservation, until it is changed.

To synchronize all the nodes on the time-slots tags, the master-node may transmit packets at time-slot number zero to each of the nodes. Each node receiving the synchronization packet resets its local modulo M counter. After that, the counter is incremented every time-slot, and nodes can rely on the counter for the current time-slot tag.

Given that there are M different time-slots, the reservation map includes M time-slot reservations or sets. An M×N matrix, where M is the reservation frame size and N is the number of nodes/wavelengths, represents the reservation map. The columns of the matrix represent the reservation slots, the rows represent the source nodes/wavelengths and the values represent the destination nodes/wavelengths.

Figure 3:
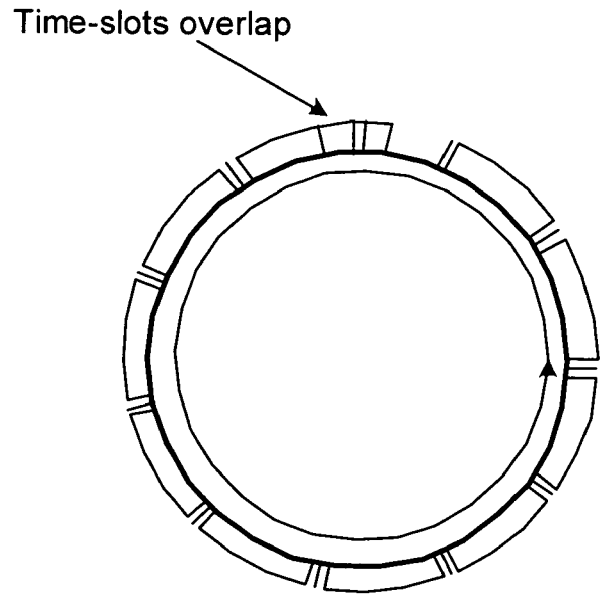
FIG. 3 illustrates time slots around an optical fiber ring, and illustrates a collision at the origin.

On a ring topology, the use of a reservation frame requires a special attention to the ring length. Time-slots transmitted to the left merge into time-slots that arrive from the right. Consequently to keep an accurate merge of time-slots at the origin (the master-node location or where the time-slots count starts), the ring length must be equal to an integer number of time-slots. If the ring length is not an integer number of time-slots, the tail time-slot overlaps the head time-slot, as illustrated in FIG. 3, which may cause collisions.

In order to keep the time-slots from overlapping, time-slot boundaries may be locked by a single source. For example, the master-node can transmits the time-slots clock on a dedicated wavelength. The transmitted clock will propagate around the ring and will return to the master-node. Then, a locking mechanism at the master-node can set the time-slots duration to eliminate the time-slots overlapping. In this case, the ring length and the time-slot size can be determined by time-slot clock adjustments. Because the residue divides between all the time-slots on the ring, the adjustment needed equals to the residue divided by the number of time-slots. The advantage of the reservation allocation algorithm is that the fiber-ring length needs only to be an integer number of time-slots and not an integer number of reservation frames.

FIG. 4 illustrates ring 40 with length equal to an integer number of time-slots. Transmitted time-slots from the master-node go around the ring and return to the origin, located at master node 0. At the origin, old time-slots merge into the new time-slots. We define X as the number of time-slots in the ring modulo M (number of time-slots in a reservation frame). If X equals to zero then the mergers are between time-slots with the same tag, and the same reservation. Therefore, an independent reservation map, in which time-slots reservations are independent of other time-slots reservation, can be used. This is the simple case, and the algorithm for computing the reservation map is equivalent to the maximum matching problem on an N-to-N bipartite graph. This problem has a known solution such as the one described in "Open shop scheduling to minimize finish time", by T. Gonzalez and S. Sahni, Journal for the Association for Computing Machinery, Vol. 23, No. 4, October 1976. The contents of this publication is non-essential to the understanding of the present invention, and is hereby incorporated by reference. An illustration of a bipartite graph solving a maximum matching problem will be discussed below with respect to FIG. 8, and therefore, a more detailed description is not necessary.

On a practical system the ring length cannot be constantly set, and thus a synchronization method should be applied to maintain synchronization even if the fiber-ring length changes due to temperature changes and aging. However, to maintain ring length with an integer number of reservation frames is not practical. For example on a system in which M equals to 128 and time-slot duration is 2 microseconds, the ring's length granularity, and minimum length is 25.6 Km. That is why practical systems should rely on a ring length with only an integer number of time-slots requirement. With this requirement the ring's length granularity and minimum length is for example only 400 m.

In a case in which the number of time slots X is not equal to zero, the mergers are between time-slots with a different reservation. Therefore, to build a collision free reservation map, the dependent reservation map algorithm described below may be used.

Since different wavelengths do not collide, the dependent reservation map problem can be divided into N different problems. Each problem represents a different wavelength. Moreover, the fact that each wavelength is dropped some where in the ring simplifies the problem. For each destination or different wavelength, the source nodes are classified into two collisions groups—the source nodes that their packets cross the origin enroute to the destination and the source nodes that their packets do not cross the origin enroute to the destination.

FIG. 5 illustrates the path around the ring for a wavelength W2. The wavelength W2 is dropped at node 2, and thus the first node that can add it to the ring is node 3. As shown above the overlapping problems occur only when packets are crossing the origin.

Examination of the path of W2 shows that time-slot k of node 3 overlaps with time-slot (k+X) modulo M of nodes 0 and 1. Thus, the dependent reservation map algorithm must not allocate time-slot k to node 3 and time-slot (k+X) modulo M to node 0 or 1. However it can allocate time-slot k to node 3 and 0. FIG. 6 shows an example to dependent reservation map for wavelength W2. At time-slot 0, both node 3 and node 1 transmit wavelength W2 and on time-slot 1 node 0 transmits it. The cross-filled cells represent time-slots in which transmitting wavelength W2 is not allowed due to allocation constraints.

Figures 7, 8:
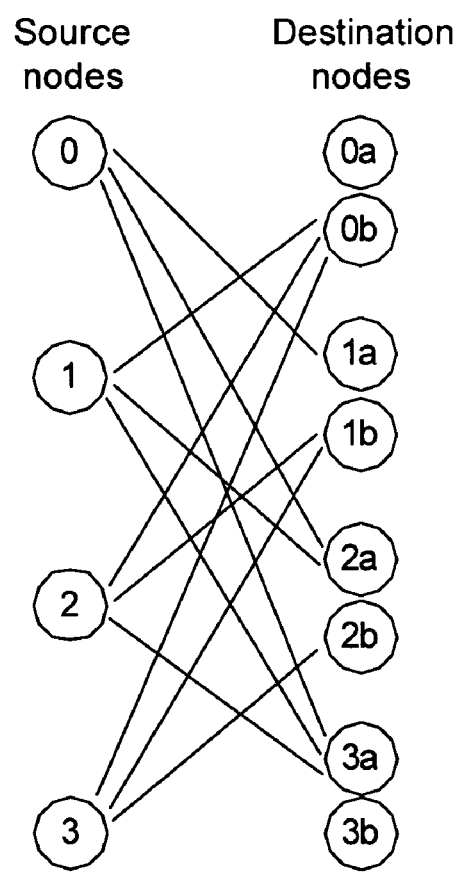
FIG. 7 illustrates a demand matrix according to the invention.
FIG. 8 illustrates a matching bipartite graph addressing allocation.

As mentioned previously, the building of the dependent reservation map can be converted into a maximum matching problem in a bipartite graph. FIG. 8 shows a bipartite graph representing the problem for four nodes. The left nodes represent the source nodes and the right nodes represent the destination nodes in the two collision groups. The collision group and the edges between the nodes are defined according to the demand matrix. To solve the reservation problem there is a need to find a maximum matching for each reservation slot in the reservation frame. The maximum matching problem may be solved using, for example, the known HK algorithm ("An $n^{2.5}$ algorithm for maximum matching in bipartite graphs", J. E. Hopcroft and R. M. Karp.

The variables and initial conditions for the dependent reservation map can be as follows:

1. There are N nodes around the ring. Nodes identification is from 0 to N−1, starting at the master-node with id #0 and incrementing in the direction of the transmission.
2. Reservation frame has M continuous time-slots.
3. X is the number of time-slots around the ring modulo M (modulo stands for the residue in integer division and is also marked as "%", i.e. X % M is the same as X modulo M).
4. The demand matrix, marked as D, is N×N matrix which fulfills—
   a. d(s,d) is the demand from node s to node d in number of time-slots per reservation frame (equals to $$TransmissionBitRate \times \frac{d(s, d)}{M} \text{ bandwidth}$$

b. $d(i,i)=0, \forall i | 0 \leq i < N$ c. $\sum_{i=0}^{N-1} d(i, d) \leq M, \forall d | 0 \leq d < N$ d. $\sum_{i=0}^{N-1} d(s, i) \leq M, \forall s | 0 \leq s < N$ 5. $K_0, \ldots, K_{M-1}$ are constrain groups for the M reservation map time-slots.
6. B is the constrained time-slots group.
7. F is the non-constrained time-slots group.
8. $G(S \cup T, E)$ is a bipartite graph with vertex set $S \cup T$ and edges set E (if (i,j) is an edge in E then $i \in S, j \in T$ or $i \in T, j \in S$). S is a set of vertices representing source-nodes $\{S_0, S_1, \ldots S_{N-1}\}$, while T is the set representing destination-nodes & collision groups $\{T_{0,0}, T_{0,1}, T_{1,0}, T_{1,1} \ldots T_{N-1,0}, T_{n-1,1}\}$. w(i,j) represents the weight of edge (i,j) in E.
9. R is the reservation map N×M matrix. r(s,m) is the destination node/wavelength which is reserved to source node s at time-slot m. If r(s,m)=−1 then there is no reservation for source node s at time-slot m.

Based upon the variables and conditions discussed above, the dependent reservation map is then constructed according to the following steps:
1. Build a bipartite graph according to the demand matrix and the collision groups.
2. Select a time-slot from the unallocated time-slots, which has the maximum constraints (allocation constraints).
3. Set the bipartite graph according to the selected time-slots constraints, in a way that allocation-constraints vertices and the edges connected to them are removed from the original graph.
4. Find maximum matching set for the adapted graph.
5. Decrease by one the weight of the original graph edges, which are included in the maximum matching set.
6. Update the reservation map time-slot according to the maximum matching set.
7. Update the time-slots constraints according to the maximum matching set.
8. If there is still an edge in the original graph, which has positive weight, go to step number 2, otherwise end algorithm.

Mathematically, the construction of the reservation map is illustrated as follows:

```
Procedure Dependent_Reservation_Map (X,D,R)
    // Initialization
    K_m ← {φ}, ∀m| 0 ≤ m < M
    B ← {φ}
    F ← {0,1,2, . . . , M − 1}
    r(s,m) ← −1 , ∀s,m| 0 ≤ s < N,0 ≤ m < M
    // Bipartite Graph initialization
    w(S_i, T_{j,0}) = { d(i, j), j > i     w(S_i, T_{j,1}) = { d(i, j), j < i
                      { 0, otherwise                         { 0, otherwise E ← {(S_i,T_{j,g})|∀(S_i,T_{j,g})| w(S_i,T_{j,g}) > 0}
    S ← {S_0,S_1, . . . S_{N−1}}
    T ← {T_{0,0},T_{0,1},T_{1,0}T_{1,1} . . . T_{N−1,0},T_{N−1,1}}
    Define Bipartite Graph G(S∪T,E)
    // Loop
    While ( F ≠ {φ} or B ≠ {φ} and there is w(S_i,T_{j,g}) > 0 )
        // Select Time-slot
        If B ≠ {φ}
            v ← {b| |K_b|≥|K_l|∀b,l ∈ B}
            B ← B − {v}
        Else
            v ← {b|b ∈ F}
            F ← F − {v}
        Order_TimeSlot(v,X,R,K,F,B,G)
    End-While
End-Procedure
Procedure Order_TimeSlot(v,X,R,K,F,B,G)
    // Find Maximum Matching
    T̄ ← T − K_v
    Ē ← E − {(i,j) ∈ E | i ∈ K_v, j ∈ K_v}
    Define Bipartite Graph Ḡ(S ∪ T̄,Ē)
    Find graph Ḡ maximum matching C = {(S_i,T_{j,g}), . . .}
    // Decrease weight from the matching set edges
    w(S_i,T_{j,g}) ← w(S_i,T_{j,g}) − 1 , ∀w(S_i,T_{j,g})|(S_i,T_{j,g}) ∈ C
    // Update the reservation map matrix
    R(i,v) ← j , ∀j|(S_i,T_{j,g}) ∈ C
    // Update the time-slots constraints
    v1 ← (M − X + v) modulo M
    v2 ← (X + v) modulo M
    K_{v1} ← {T_{j,1}, ∀T_{j,1}| (S_i,T_{j,0}) ∈ C}
    K_{v2} ← {T_{j,0}, ∀T_{j,0}| (S_i,T_{j,1}) ∈ C}
    B ← B + v1 + v2
    F ← F − v1 − v2
End-Procedure
```

Figure 13:
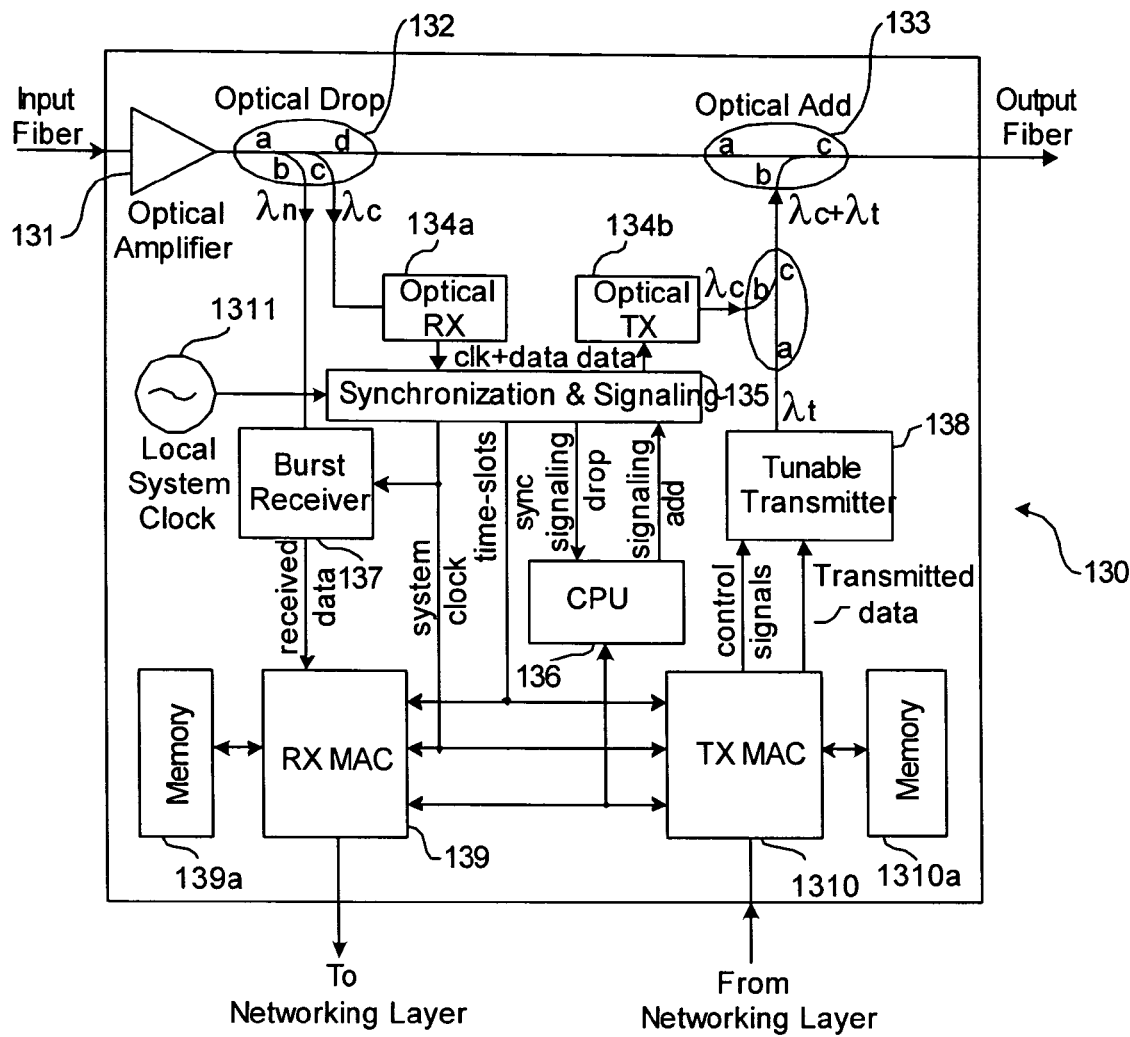
FIG. 13 illustrates a hardware implementation of a node, according to one embodiment of the present invention.

FIG. 13 illustrates one example of a node implementation for an optical network based utilizing a MAC as described above. The optical network is built from several nodes connected by an optical fiber ring (FIG. 1).

The proposed node implementation in this example is based on the following assumptions—
1. Each node in the network has the same implementation, except for different wavelength drop ($\lambda_n$).
2. One node in the network is defined as master-node. The master-node position is defined as the origin of the ring. The master-node broadcasts the system clock and time-slots synchronization.
3. The network synchronization is done using dedicated common wavelength ($\lambda_c$) that is received by each node and retransmitted (daisy-chain). The common wavelength can also be used as a signaling channel between the nodes.

The node 130 that is illustrated in FIG. 13 is connected to an optical ring using fiber-in input and fiber-out output. In order to compensate on the network losses it is possible, in one configuration to connect an optical amplifier 131 in the node entrance. The optical amplifier 131 can be a low-gain amplifier which is located in each node, or a high-gain amplifier which is located in some but not necessarily all of the nodes.

Following the optional optical amplifier 131, the optical signal pass subsequently thru a dual optical-drop element 132 and a wide optical add element 133. The dual optical-drop element 132 is used to filter out and drop the node-wavelength and common-wavelength from the passing optical signal. The drop element has one optical input (a) and three optical outputs (b, c, d). The optical signal, includes of multiple wavelengths, comes into input (a) and splits to three optical signals—the node-wavelength which comes out of output (b), the common-wavelength which comes out of output (c), and all the other wavelengths which come out of output (d). The wideband optical add element 133 is used to add the transmitted-wavelength and the retransmitted common-wavelength to the optical signal. This element should be a wideband since the transmitted-wavelength can be from a variety of wavelengths. The passing optical signal comes into input (a) and combines with the transmitted signal that comes into input (b). The sum of the signals comes out from output (c).

The synchronization module includes an optical transceiver including receiver 134a and transmitter 134b and synchronization logic block 135. The optical receiver 134a receives the dropped common-wavelength, recovers the data and clock, and converts the optical signal to an electrical signal. The electrical signal is processed by the synchronization logic 135 which synchronizes on the digital frame and extracts the time-slot synchronization. If the common-wavelength is used also as a signaling channel between the nodes the logic block drops and adds signaling packets, which are processed by CPU 136.

On the receive side, the dropped node-wavelength comes into an optical burst mode receiver 137. The optical burst mode receiver includes of an amplifier, fast-locking CDR (clock data recovery) and a demux element; it extracts the packet from the optical signal and converts it to electrical signal. On the transmit side the transmitted packet is transmitted on the scheduled wavelength using an optical tunable transmitter 138. The transmitter wavelength and the common-wavelength and both added to the fiber-ring.

The RX-MAC module 139 handles the packets which are extracted by the burst mode receiver. The RX-MAC module handles the packets queuing and forwards the packets to the networking layer. The TX-MAC 1310 receives packets from the networking layer, handles the packets queuing and forwards the packets to the tunable transmitter according to the reservation map scheduling. In order to improve the BER performance it is possible to combine in the RX-MAC 139 a forward error correction decoder and an encoder in the TX-MAC 1310.

RX-MAC 139 is connected to memory 139a for appropriate storage and buffering of packets; similarly, TX-MAC 1310 is connected to memory 1310a. These memories can be DRAM, SRAM, SDRAM, or any other suitable memory type of a suitable memory size based upon the particular application and network requirements. It should be noted that node 130 can be provided with a remote system clock, or local system clock 1311.

The main tasks of the CPU 136 are the algorithm tasks of calculating the demand-matrix, creating the reservation map, and handling the system signaling-channel.

Calculating the reservation map can be done using two approaches—centralized and distributed. In the centralized approach slave-nodes transmit the demand vectors to the master-node. The master-node builds from the demand vectors a demand-matrix and calculates an appropriate reservation map. The reservation map is then broadcast to the slave-nodes using the common channel. In the distributed approach each node broadcasts its demand vectors to the plurality of nodes. Then, the plurality of nodes may change the reservation frame according to a distributed reservation map algorithm. For example, in the distributed approach two, or more, nodes can exchange time-slots allocations between them in order to perform a small change in the reservation frame. Since this change affects a limited number of nodes, the calculation may be much faster and other nodes are not interfered. In large networks the distributed method is recommended since the reservation map calculation can be distributed to multiple nodes instead of executed in a single node. However, based on available computing power, the centralized approach can be feasible even in large networks.

Figure 14:
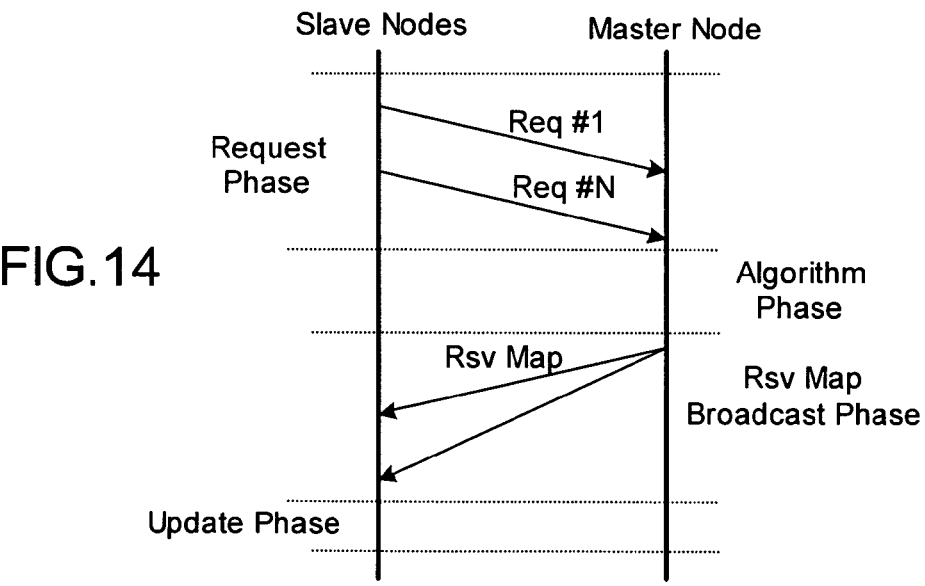
FIG. 14 illustrates resource allocation between slave nodes and a master node.
Figure 15:
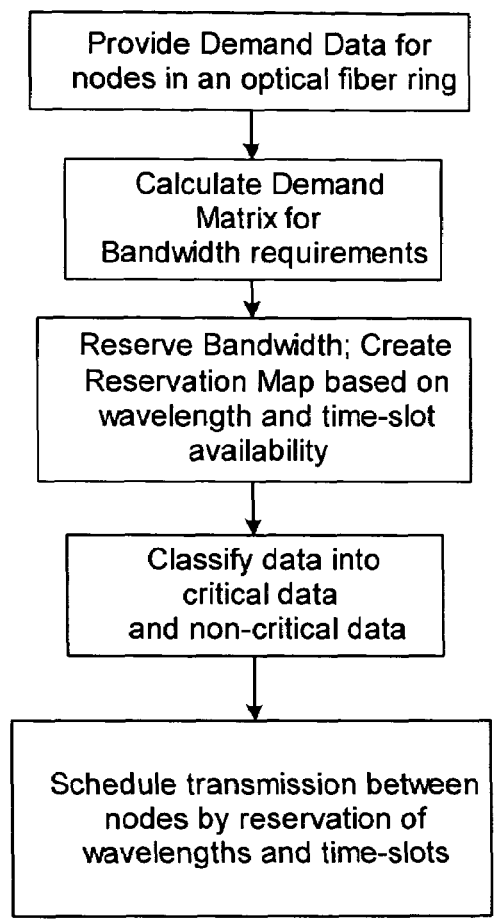
FIG. 15 illustrates a method of reserving bandwidth according to an embodiment of the invention.

FIG. 14 illustrates the negotiation phases between the slave-nodes and the master-node, to compute reservation map in a centralized approach. The negotiations in this case, are done in an out-of-band signaling channel, such as the common-wavelength channel.

In phase 1, the request phase, the slave-nodes transmit their demand vectors (resource demands for each other destination node) to the master node. Two types of demand vectors may be transmitted to the master node: the committed bandwidth vector, and the best-effort bandwidth vector. The committed bandwidth vector specifies the number of time-slots per reservation map the node need for each of its destination nodes. The best-effort bandwidth vector specifies the number of time-slots per reservation map the node optimally wants. This vector will also specify the priority of the best-effort resource demands; in order to let the master node divides the best-effort bandwidth between all of the network nodes.

Following the receiving all the slave-nodes demand vectors, the master node is calculating the reservation map in Phase 2, the algorithm phase. The algorithm will first allocate the committed bandwidth between all the nodes and then will divide the extra bandwidth according to the best-efforts demands and priorities. At the end of this stage the master node will have a new reservation table optimized to the nodes' demands.

After the master node builds the reservation map it distributes it to the slave node in Phase 3, which is a reservation map distribution phase. The distribution of the reservation map is done via the broadcast channel or through the in-band channels. The distribution of the reservation map must be performed before the predefine update time is reached.

Phase 4, the global update phase, occurs cyclic every R (R is predefined) reservation frame between time-slot M−1 and time-slot 0. When the update time is reached nodes replace the current reservation map with the latest reservation map. The global update at the same time-slot assures that time-slots will relate to the same reservation map, and collisions will not take place. Node that didn't receive a new reservation map from the last update time will stop transmitting when a new update time is reached. This will avoid a scenario in which the node fails to receive a new reservation map and keeps transmitting according to the old reservation map.

As mentioned above another possible reservation calculation method is based on distributed negotiation. Distributed negotiation algorithm can be implemented in several ways.

On way of implementing the distributed algorithm is by using a trading like mechanism, in which a node that requires more bandwidth negotiates with other nodes that hold time-slots to the destination node and don't use them to exchange time-slots allocation. In order to find out which of the nodes in the system does not use all it's allocated bandwidth to the destination, the source node can either ask the destination node or can broadcast a message to all the nodes in the system. This implementation of the distributed algorithm is more complicated to manage, especially when quality of service rules need to be applied to the network.

Another possible implementation of the distributed algorithm is by giving each destination node (allocator) the authority to manage it's incoming bandwidth. In this case, when a node requires more or less bandwidth to a destination node, it sends a request to the allocator (destination node). The allocator knows all the bandwidth allocations and the quality of service requirement for the incoming bandwidth (e.g., node X has higher priority then node Y). According to this data, the allocator allocates or releases more or less bandwidth (time-slots) to the requestor (the source node). In addition, since the allocator can monitor the incoming bandwidth, it can detect when a node does not use it's full allocated bandwidth. In this case the allocator can release the unused allocated bandwidth, and allocated that to other source nodes, or keep it as a local reserved. This approach of the distributed algorithm also provides the allocator with control of the amount of the incoming bandwidth in case of congestion in the egress port.

When using a distributed algorithm or not, optimisation of centralize algorithm the reservation map can be blocked. The blocking situation occurs when time-slots cannot be collision free allocated, although the reservation map is not fully allocated. In order to release this blocking situation, and thus optimize the reservation map allocation, there is a need to reorder the reservation map.

Assuming that a blocked reservation map and an allocation from source to destination that cannot be allocated due to collision, this means that the source node has at least one free time-slot to transmit, but cannot transmit at this time-slots since the destination node already receives packet at this time-slots from other source node ("destination collision"). In addition, the destination node has at least one free time-slot to receive, but this time-slot cannot be used since the source node already uses this time-slot for other transmission ("source collision").

To reorder a blocked reservation map and add one time-slot allocation the following recursive algorithm can be used:
1. The algorithm first tries to allocate the time-slots in a free location. If this succeeds, the algorithm ends;
2. If there is no free time-slot for the allocation, the algorithm allocates the time-slot in one of the destination collision or source collision time-slots (the algorithm does not try to allocate where destination collision and source collision occur); thus, this allocation ("new allocation") causes a single collision.
3. In order to solve the collision caused by the new allocation, the algorithm releases the allocation that collides with the new allocation, and tries to reallocate it from step #1 (recursive call).

The above algorithm is a recursive algorithm, which stops the recursion when the time-slots are allocated without collision or when the recursive depth passes the algorithm depth limit parameter. Simulating this algorithm shows that a depth of 10 provides a blocking situation of less then 2%.

Figure 9:
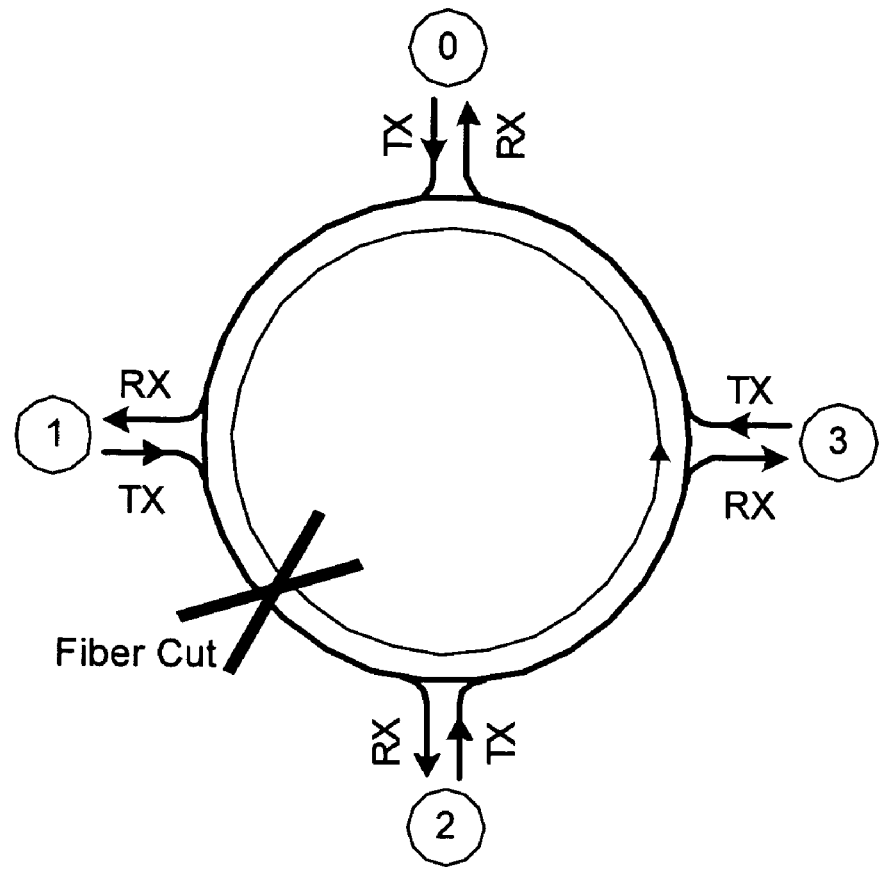
FIG. 9 illustrates an optical fiber ring encountering a fiber cut scenario.
Figure 10:
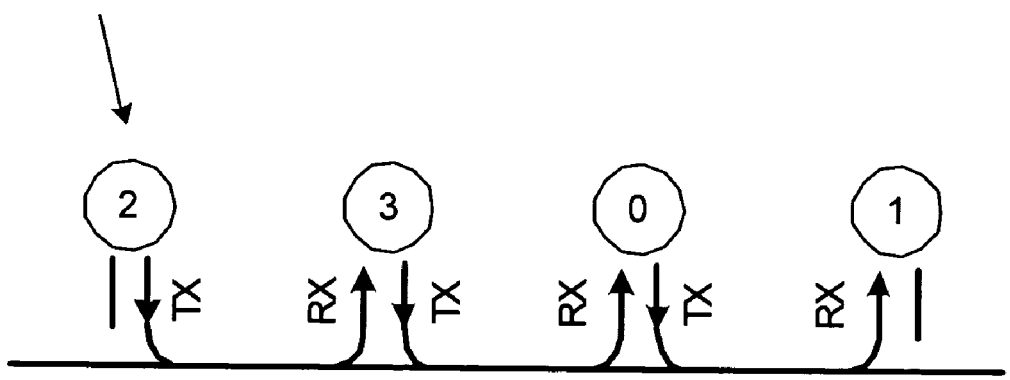
FIG. 10 illustrates a single fiber network topology after a fiber cut.

One of the important issues in an optical network is the network protection. Carrier-class networks are demanded to guarantee "five-nines" (99.999%) service availability, even if a single failure occurs. The most fatal failure in optical ring networks is a fiber cut, as illustrated in FIG. 9. This failure is more critical in all-optical networks since it influences half of the source-destination paths. To support the carrier-class standard, synchronized optical packet ring networks are required to have a protection scheme, which will handle link failures. To achieve that, dual counter-rotating rings should be implemented. This is a known solution from other optical networks such as SONET, however in the all-optical network a fiber-cut failure requires a different reconfiguration scheme. In the SONET-like solutions, after a fiber-cut, each node receives a valid data stream from at least one side (west or east) and thus simply selects the valid data stream. In the all-optical fiber-ring, after a fiber-cut, the two rings become dual unidirectional busses. According to the present invention, this new configuration requires a new reservation map; one which will take into accounts that connection to a destination node might be available only from a single direction. Possible connections between the nodes are lower in number and dependent on their positions. The two nodes on the edges of the bus suffer a cut of half the original bit rate. This is caused because there is only one direction to which they can receive and transmit data. The middle node, for example, still has full capacity. Since the fiber is cut, the new reservation map can be computed using an independent reservation map, which is a faster algorithm. Still, the reconfiguration time (detection time+algorithm execution time) might require more than the 50 mSec allowed by SONET. This is why critical services (such as SONET traffic) should be handled differently than non-critical services (such as IP traffic). As can be seen, a single cut doesn't cut-off any node, although it could lower its capacity. In order to recover as quickly as possible, critical connections between any two nodes should duplicate on the two separate fibers. In this method, when the connection is cut-off from one direction, the same packets can be taken from the unaffected direction. Although there is a bandwidth waste when the system operates normally, a fast-connection recovery is guaranteed in times of failure. Non-critical connections, which are less sensitive to reconfiguration time, are transmitted only on a single ring. This way, up to twice bandwidth can be achieved, time-critical traffic gets to the destination in a timely manner, and non-critical traffic reaches the destination after the new reservation map is configured.

Figure 11:
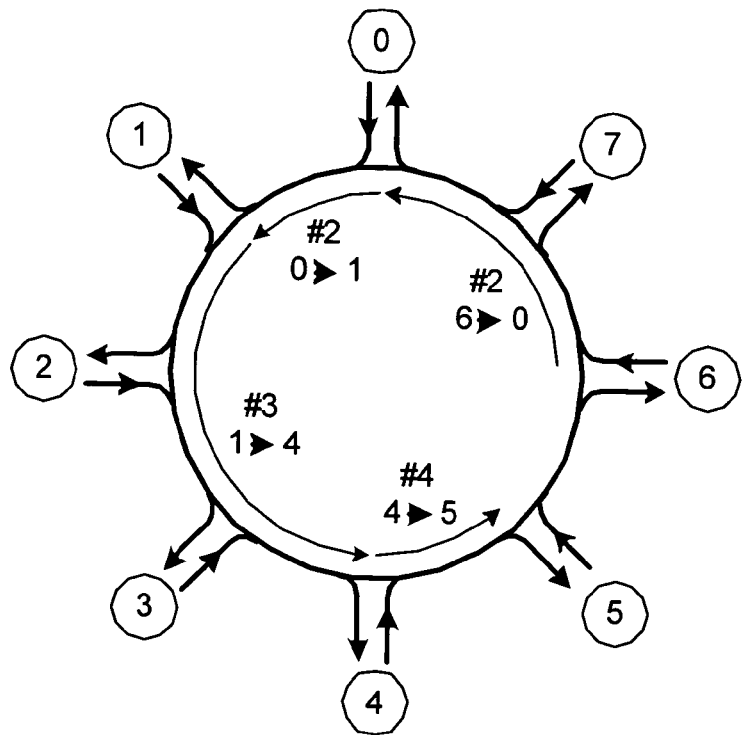
FIG. 11 illustrates a daisy-chain multicast example.

Many current and future applications may require a multicast ability. On a single ring, multicasting to a sub-group is typically done through all of the nodes, which are located between the sub-group nodes. Each node has to drop the packets, examine their addresses and forward them, even if the packets are not addressed to it. Multicast is then transformed into broadcast, which means that the node theoretical capacity is not exploited and there is a waste of bandwidth. In an all-optical fiber-ring topology, source nodes transmit packets directly to the destination nodes, not involving any other nodes on the ring. A multicast tree can easily be formed by daisy-chain connections between the nodes in the multicast sub-group. This is a daisy chain multicast as illustrated in FIG. 11. The node that initiates the multicast transmission transmits the multicast packets directly to the first member of the multicast group. The receiving node, in its turn, transmits the same packet directly to the next node on the list. Aside from the nodes on the multicast tree, no other nodes are involved.

Figure 12:
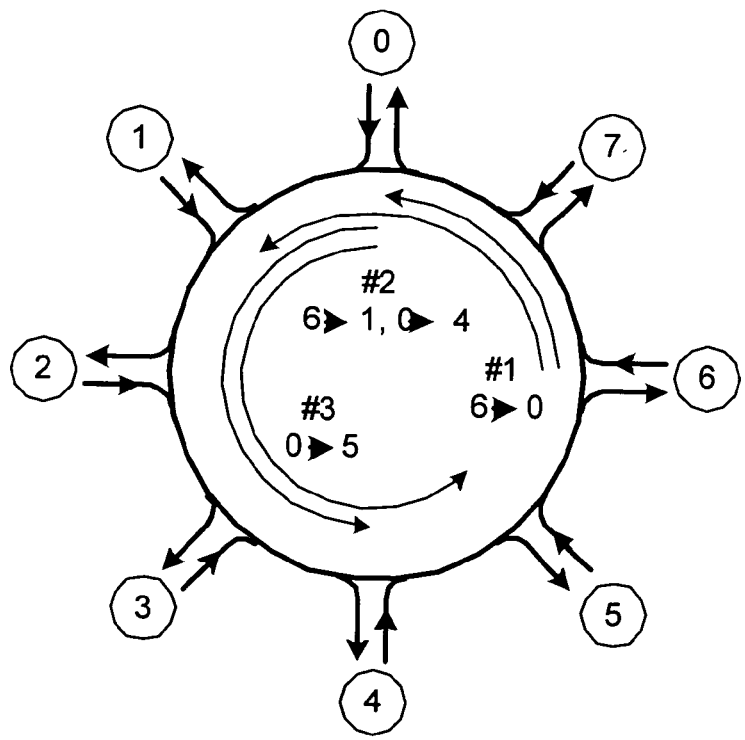
FIG. 12 illustrates a spanning tree multicast example.

When the multicast tree is too large, and the multicast packet delay of the last nodes can be too large. The invention may use a spanning-tree multicast (FIG. 12). In the spanning-tree multicast, each receiving node duplicates the packet and transmits it to two other nodes in the multicast-group. This causes the multicast delay short form $O(N)$ on the daisy-chain method to $O(Log_2 N)$. Nevertheless, this method requires additional bandwidth, which increases by bandwidth requirements by a factor of two when compared to the daisy chain method.

In other words, with reference to FIG. 12, if a packet is being multicast from node 6 to nodes 0, 1, 4, and 5. On the first time-slot node 6 transmits to node 0. On the next time-slot node 6 transmits to node 1 and node 0 transmits to node 4. On the last time-slot node 0 transmit to node 5. This significantly decreases latency to node 5, but can, as discussed above, increase bandwidth requirements due to the fact that node 6 has to transmit the packet twice. In the daisy-chaining method, as illustrated in FIG. 11, node 6 would transmit the packet to node 0 in time slot 0, and then node 0 would broadcast the packet to node 1 in the following time slot, and node 1 would then broadcast the packet directly to node 4, which, when received, would broadcast the packet directly to node 5. While requiring less bandwidth, this introduces additional latency to node 5.

Figure 16:
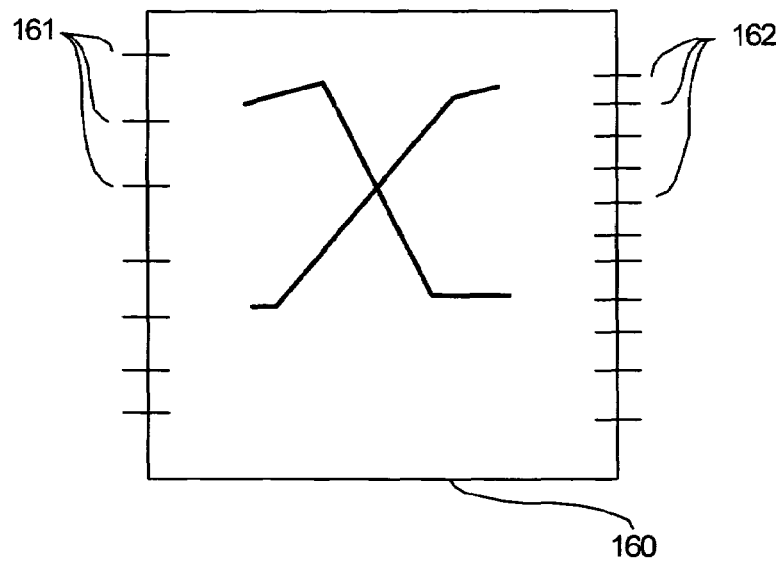
FIG. 16 illustrates an embodiment of the invention applied to a network switch such as a cross bar switch.

The above discussion of the invention is directed to implementation on a fiber-optic ring network. It should be noted, however, that the invention is applicable to other types of networks, including more conventional copper-type networks. The demand matrix and the reservation map algorithms and configurations, as discussed above, could be applicable to, for example, a network switch such as a cross-bar switch as illustrated in FIG. 16. Cross-bar switch 160 has a plurality of ports 161 and 162. The ports can be configured to communicate with each other by using a series of buses and a series of time slots, based upon availability. The invention discussed above, including the discussion of the demand matrix and reservation map, is applicable to the reservation of the plurality of buses and the plurality of time slots in a cross-bar switch 160. Other configurations of the invention, both in fiber-optic and copper or wired configurations, is within the scope of person of skill in the art. Although the embodiments discussed above are specific to time-slots and wavelengths in a fiber-optic ring, the disclosed methods and systems are applicable for reserving bandwidth in one or more queues which may have limited access to a resource such as a bus, and conventional packet information such as source address, destination address, VLAN identification information, class-of-service (COS) information, and other packet handling data.

Another object of this invention is to propose an enhanced MAC algorithm based on the algorithm discussed above or any other reservation-based algorithm which enables the use of tunable receives in the network/fabric-switch in addition or in replacement to the tunable transmitters.

Today's all-optical networks proposals are based on using tunable transmitters to send a packet to a fixed receiver. However, the development of new optical components enables the use of tunable-receivers. In a reservation based system the tunable transmitters and fixed receivers can be replaced by tunable receivers and fixed transmitters. In the new implementation, the destination optical element tunes its receiver to the transmitter wavelength. The main gain of using fixed transmitters instead of tunable ones is that fixed transmitters can transmit higher optical power. This decreases the system power budget limitation in that it improves the system performance and capabilities.

Additional implementation proposed in this invention is using both tunable transmitter and tunable receiver in the system. Although using two tunable elements does not improve the system dynamic allocation it simplifies the system deployment. Systems which are based on fixed elements (transmitters or receivers) are required to be designed in a way that no two elements with the same configuration will be connected to the same network. By using only tunable elements the network can configure itself during the initialization process avoiding the pre-design.

Figure 17A:
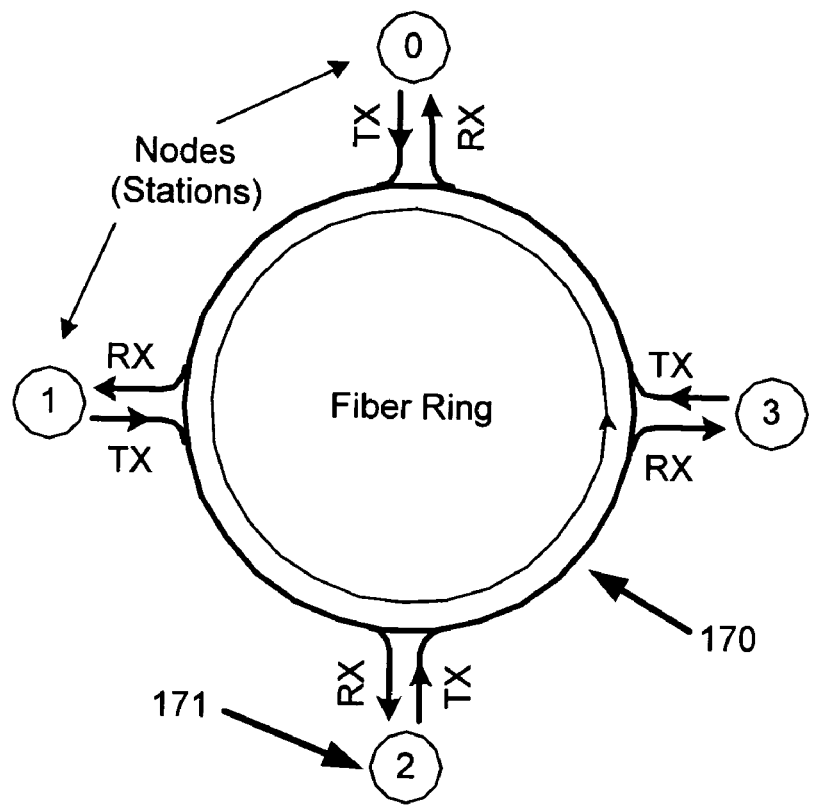
FIG. 17A illustrates an optical fiber network having a plurality of nodes, according to one embodiment of the present invention.
Figure 17B:
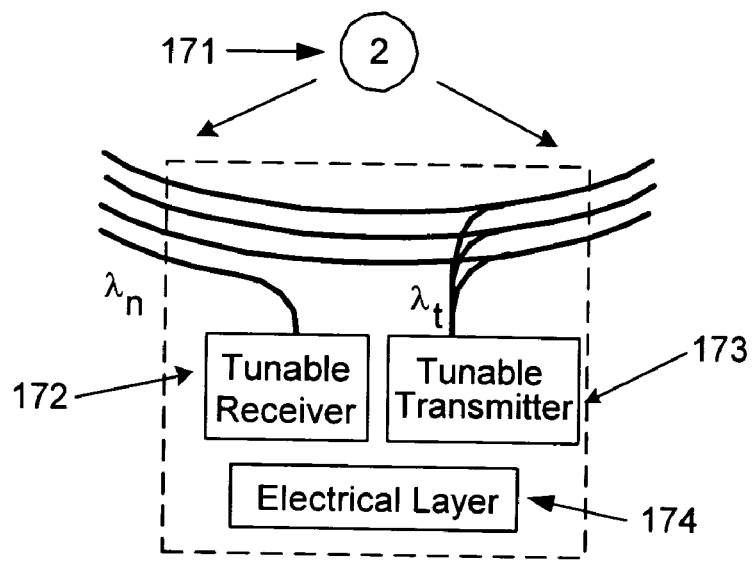
FIG. 17B illustrates a tunable receiver, tunable laser, and electrical layer as provided in each node, according to one embodiment of the present invention.
Figure 18A:
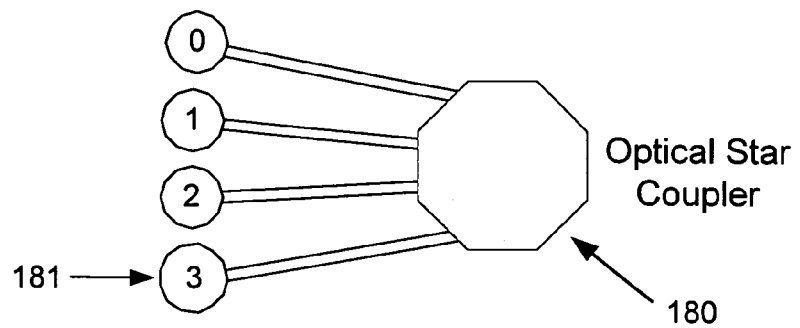
FIG. 18A illustrates an optical fiber network having a plurality of nodes, according to one embodiment of the present invention.
Figure 18B:
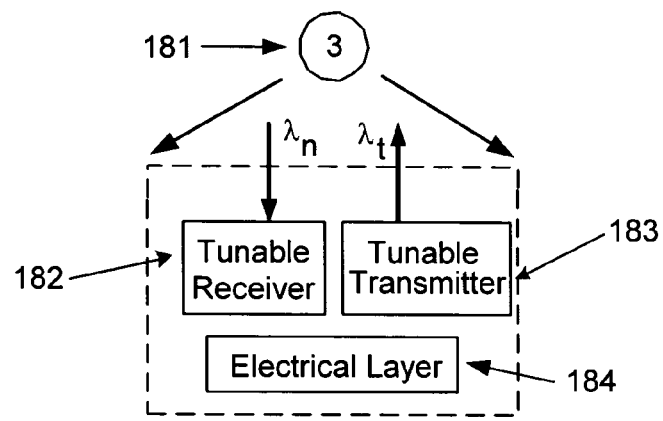
FIG. 18B illustrates a tunable receiver, tunable laser, and electrical layer as provided in each node, according to one embodiment of the present invention.
Figure 19:
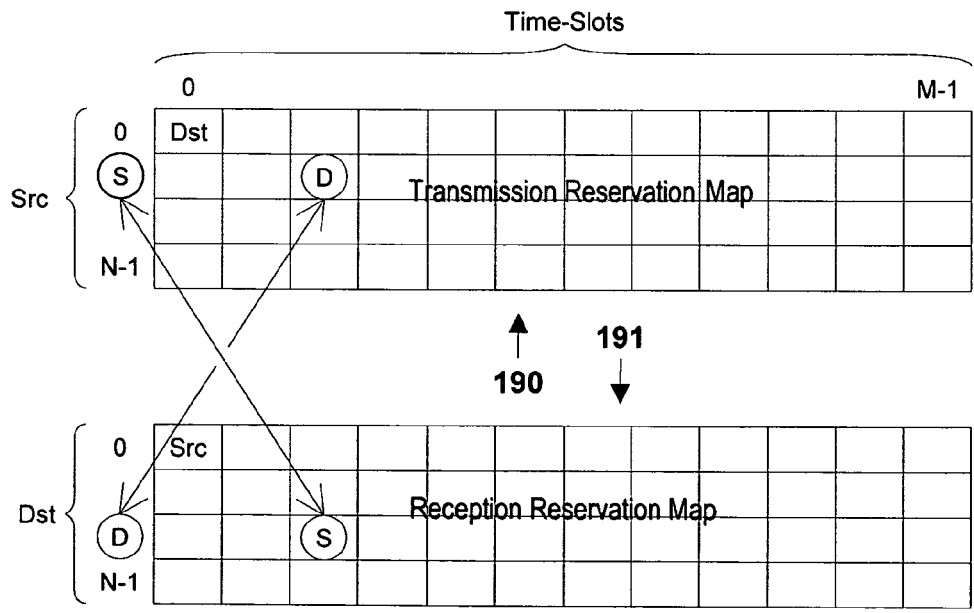
FIG. 19 illustrates reservation maps according to one embodiment of the present invention.

The invention is therefore directed, in the embodiments discussed below, to a system and method for all-optical switching system such as network or fabric-switch, in which optical elements 171 are equipped with tunable laser transmitter 172 and/or tunable receiver 173, as shown in FIG. 17B. Both tunable elements are controlled by the electrical layer 174. The optical elements in the system may be connected using a fiber-ring 10 topology, as shown in FIG. 17A, or using an optical star coupler 20 topology, as shown in FIG. 18A. In the latter embodiment, the optical element 181, for example, are equipped with tunable laser transmitter 182 and/or tunable receiver 178, with both tunable elements being controlled by the electrical layer 184, as shown in FIG. 18B.

The all-optical system enables to establish up to N connections simultaneously, wherein N equals the number of optical elements or/and wavelengths. In order to maximize the number of connections, a collision free MAC should be used. The MAC uses a reservation mechanism, in which a set of connections is predefined for each time-slot. The connection set is defined in a way that collisions do not occur, i.e. two optical elements do not transmit in same wavelength at the same time-slot and two optical elements do not receive in the same wavelength at the same time-slot.

Generally, a reservation based MAC requires time-slots to be tagged. This way all optical elements will associate the same time-slots with the same reservation. The MAC tags time-slots with incremented numbers from 0 to M−1 repeatedly. M continuously time-slots (from 0 to M−1) formed a reservation map as illustrated in FIG. 3. All time-slots with the same tag number have the same reservation definition. The reservation map can be either a transmission reservation map which schedules the tunable transmitter transmissions or a reception reservation map which schedules the tunable receiver reception.

For embodiments that utilize only tunable transmitters, a transmission reservation map is calculated according to a demand matrix. The algorithm discussed above may be used to calculate this reservation map. For embodiments that utilize only tunable receivers, a reception reservation map is needed. According to the reception reservation map, the optical elements tune, on each time-slot, their tunable receiver to the source transmitter wavelength. Such systems may calculate a transmissions reservation map, according to the demand matrix; and then convert the transmission reservation map to the reception reservation map. An example of a conversion algorithm follows.

For the example algorithm, the following variables and parameters are defined:
1. There are N optical elements around the ring. Optical element identification is from 0 to N−1, starting at the origin with id #0 and incrementing in the direction of the transmission.
2. Reservation frame has M continuous time-slots.
3. X is the number of time-slots around the ring modulo M, where modulo stands for the residue in integer division and is also marked as "%", i.e. X % M is the same as X modulo M.
4. TRM is the transmission reservation map N×M matrix. trm(s, m) is the destination that is reserved to source s at time-slot m. If trm(s, m)=−1, then there is no reservation for source s at time-slot m.
5. RRM is the reception reservation map N×M matrix. rrm(d, m) is the source that is reserved to destination d at time-slot m. If rrm(s, m)=−1 then there is no reservation for destination d at time-slot m.

An example conversion algorithm is described below:
1. Initialize all cells in RRM to −1

2. For each s (=0 ... N−1) and each m (=0 ... M−1) do as follows—
   a. If trm(s,m)≠−1 and s<trm(s,m) then rrm(trm(s,m), m)←s
   b. If trm(s,m)≠−1 and s≧trm(s,m) then rrm(trm(s,m), (m+x) % M)←s The reception reservation map may be also created directly by using the same algorithm for the transmission reservation map and replacing the reservation map assignment in this algorithm from r(s,m)←d to r(d,m)←s.

An important advantage of the tunable receiver based system is that multicast and broadcast transmissions can be done easily by tuning multiple tunable receivers to the same wavelength.

One issue with systems using either tunable receiver or tunable transmitter is that the fixed element (transmitter or receiver) in each optical element on the system has to be on a different wavelength. Since the elements are fixed the system should have different optical elements. This may cause potential manufacture and stock problems, as well as system deployment problems. One way to solve those problems is using tunable transmitter and tunable receives at each system element, as discussed in this embodiment of the invention. All the optical elements in such systems are the same and can be configured during the system initialization process to different wavelengths.

Using a tunable transmitter and a tunable receiver does not improve the system bandwidth/dynamic performance, since each optical element has still one receiver and one transmitter. The MAC for such system can relay on tuning on unit (either the receiver or the transmitter) during system initialization and using the other tunable unit for dynamic packet routing. The decision of whether to use the receiver or the transmitter for the fast routing may be based on the tuning ability of the units (speed, stability, band, etc.).

In a fiber-ring topology optical elements are connected in a daisy-chain manner, in which the output of each optical element is connected to the next optical element input using an optical fiber. Such a topology is illustrated in FIG. 17A. This topology is best applicable to a network where the optical elements are geographically far one from another; although it is also applicable for a network or a fabric-switch where the optical elements are close one to another.

On a ring topology, the use of a reservation MAC requires a special attention to the ring length. Time-slots transmitted to the left merge into time-slots that arrive from the right. Consequently, to keep an accurate merge of time-slots at the origin the ring length must be equal to an integer number of time-slots.

Figure 20:
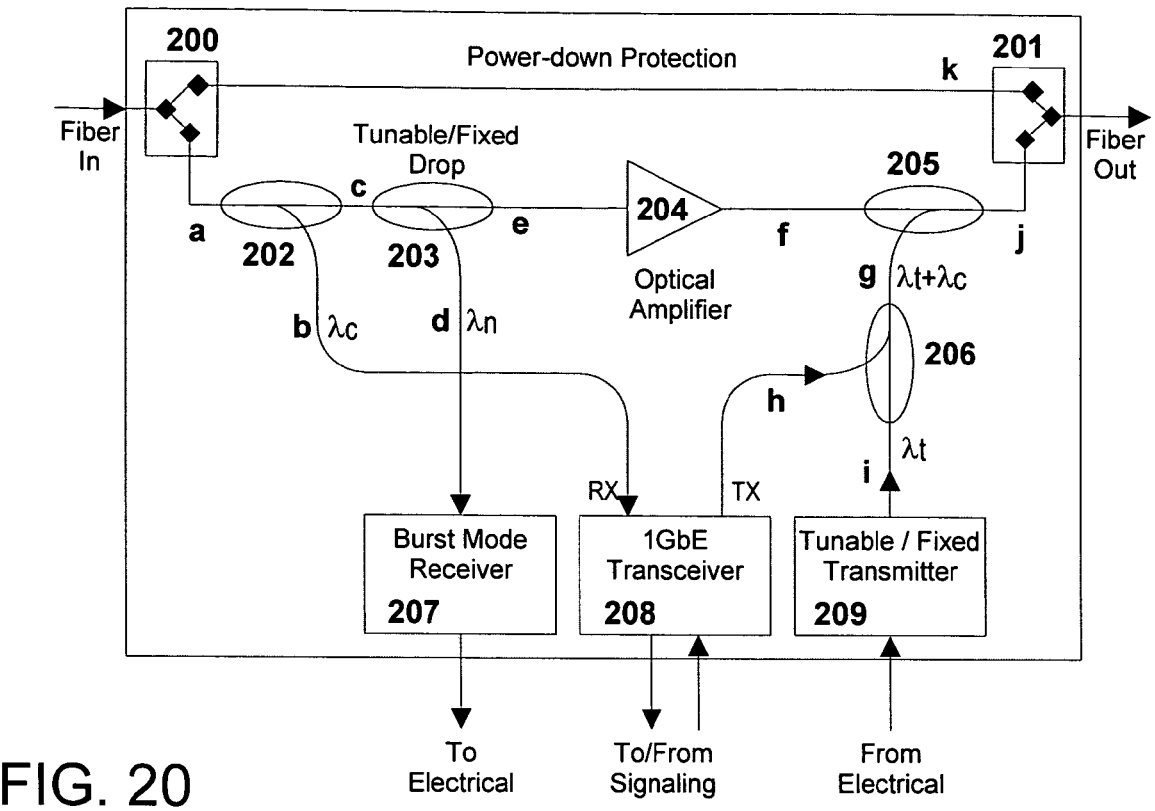
FIG. 20 illustrates a hardware implementation of a node in the fiber ring topology, according to one embodiment of the present invention.

FIG. 20 illustrates the implementation of an optical element connected to a fiber-ring topology system. Two optical switches 200 & 201 are connected at the input and output of the optical elements and enable for a bypass of the additional optical elements. In case of a power-down or a local failure the optical element can be switched to the bypass mode keeping the integrity of the fiber ring. The dedicated wavelength of the node is dropped by the tunable or fixed coupler 203. This coupler receives all the wavelengths from input (c), drops the dedicated wavelength to (d) and passes all the other wavelengths to (e). If coupler 203 is tunable, then the dedicated wavelength which is dropped to (d) can be dynamically selected. The dropped wavelength is received by the burst-mode receiver 207, which converts the optical signal to electrical and recovers the data clock.

In systems which use a common wavelength to create a signaling channel between the nodes the optical element module has drop coupler 202 and add coupler 206 are used to add and drop the common wavelength. Using the common wavelength nodes can send signaling channel one to another and broadcast the system clock. In the example implementation presented in FIG. 20, the signaling channel is based on 1 GbE transceiver 208. In order to compensate on the optical element loss, an optical amplifier 204 may be used. The exact location of the optical amplifier can be at the "middle" (as shown in FIG. 4), or at the input or at the output of the module. The tunable/fixed transmitter 209 transmits the optical signal which is added to the ring using coupler 205.

For a system in which the optical elements are located close one to another, such as fabric-switch, the common wavelength optical components may be removed and replaced with electrical interfaces for synchronization & signaling.

Figure 21:
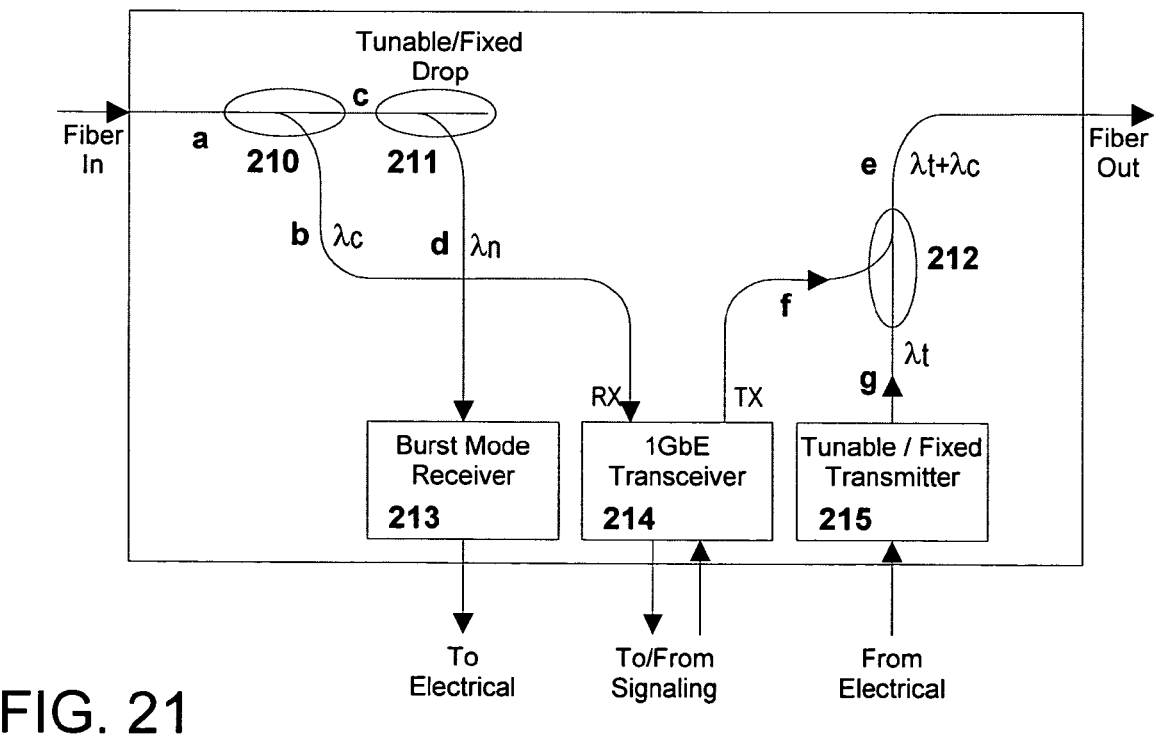
FIG. 21 illustrates a hardware implementation of a node in the star coupler topology, according to one embodiment of the present invention.

In a star-coupler topology, optical elements are connected in a star manner to a single optical coupler 180, as illustrated in FIG. 21. The optical coupler has N ingress and N egress ports. Optical elements are connected to the coupler with two connections: fiber-in, which is connected to the egress port of the coupler, and a fiber-out, which is connected to the ingress port of the coupler. The coupler combines all the wavelengths from the ingress ports are output them to the egress ports. In order to avoid large losses the coupler may be use an optical amplifier. The star-coupler topology is best applicable for systems where the optical elements are located close one to another, since it requires simpler optical element implementation. Long distance between the optical elements and the star coupler may require a special synchronization to overcome the optical delay in the fibers.

FIG. 21 illustrates the implementation of an optical element connected to a star coupler topology system. Since the optical elements are connected in a star topology the removal/failure of a certain element does not influence on the others. This is way the optical protection switches are not required. The dedicated wavelength of the node is filtered by the tunable/fixed filter 211. This coupler receives all the wavelengths from input (c) and drops the dedicated wavelength to (d). If filter 211 is tunable then the dedicate wavelength which is dropped to (d) can be dynamically selected. The dropped wavelength is received by the burst-mode receiver 213, which converts the optical signal to electrical and recovers the data clock.

In systems which uses a common wavelength to create a signaling channel between the nodes the optical element module has drop coupler 210 and add coupler 212 are used to add and drop the common wavelength. Using the common wavelength nodes can send signaling channel one to another and broadcast the system clock. In the suggested implementation presented in FIG. 21 the signaling channel is based on 1 GbE transceiver 214. On the transmission the tunable/fixed transmitter 215 output goes to the optical element output thru the common wavelength add coupler 212.

For a system in which the optical elements are located close one to another, such as fabric-switch, the common wavelength optical components may be removed and replaced with electrical interfaces for synchronization & signaling.

In summary, the invention is directed to a reservation-based media access controller which is capable of providing a full reservation optical network. The invention is also directed to an optical network which implements the full reservation algorithm, and methods of providing full reservation optical communication utilizing reservation of time-slots and wavelengths. Various configurations of an optical network and the nodes thereof can be provided, as discussed herein, and the media access controller can be created based upon a plurality of discrete components configured to form a functioning unit, and can also be formed on a single semiconductor substrate.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A communications node for an optical network, said communications node comprising:
   a tunable wavelength receiver for receiving optical data from source nodes at a plurality of source wavelengths;
   a tunable wavelength transmitter for transmitting optical data to destination nodes at a plurality of destination wavelengths; and
   a media access controller which schedules transmission to and receipt from a plurality of nodes at a plurality of time-slots and wavelengths according to at least one reservation map.

2. A communications node as recited in claim 1, wherein said communication node further comprises a reservation map unit which creates the at least one reservation map for reserving time slots and wavelengths for transmitting data to and receiving data from a plurality of nodes, made up of the source nodes and destination nodes, based upon available time slots and wavelengths in the optical network, said reservation map being based upon demand data from the plurality of nodes.

3. A communications node as recited in claim 2, wherein said communication node includes a demand matrix generating unit for generating a demand matrix based upon demand data from the plurality of nodes, and wherein said reservation map is based upon said demand matrix.

4. A communications node as recited in claim 3, wherein said reservation map is created based upon demand matrix data transmitted from another of said plurality of nodes.

5. A communications node as recited in claim 3, wherein said demand matrix unit and said reservation map unit are configured for operation with an optical ring network.

6. A communications node as recited in claim 3, wherein said demand matrix unit and said reservation map unit are configured for operation with optical elements of the optical network connected in a star-coupler topology.

7. A communications node as recited in claim 3, wherein said demand matrix unit and said reservation map unit are configured for operation with a local area network.

8. A communications node as recited in claim 2, wherein said reservation map unit is configured to set the reservation map using reservation map data transmitted from another of the plurality of nodes.

9. A communications node as recited in claim 1, wherein said tunable wavelength receiver is optimized with other tunable wavelength receivers of other communications nodes of the optical network, such that the tunable wavelength receiver and the other tunable wavelength receivers are tuned to a common wavelength to receive multicast or broadcast transmissions.

10. A communications node as recited in claim 1, wherein said media access controller reorders said reservation map when said reservation map is blocked such that the available time slots cannot be allocated without causing a collision.

11. A communications node as recited in claim 1, wherein said communication node further comprises a requestor unit, for negotiating an outgoing bandwidth allocation to the destination nodes and an allocator unit for negotiation of incoming bandwidth allocations from the source nodes.

12. A communications node as recited in claim 11, wherein said requestor unit is configured to send a request to allocate or release bandwidth from the allocator unit in the plurality of nodes, according to bandwidth demand data of the communication node.

13. A communications node as recited in claim 12, wherein said allocator unit is configured to receive a request to allocate or release bandwidth from the requestor unit in the plurality of nodes, and is configured to allocate or release time-slots and wavelengths according to at least one of the request, a request priority and system allocation rules.

14. A communications node as recited in claim 13, wherein said allocator unit is configured to allocates or releases time-slots according to local bandwidth demand.

15. A communications node as recited in claim 13, wherein said allocator unit is configured to send acknowledgement for allocating or releasing time-slots to the requestor unit.

16. A communications node as recited in claim 1, wherein the tunable wavelength receiver is fixed on one wavelength while the tunable wavelength transmitter is tuned for each time-slots according to the at least one reservation map.

17. A communications node as recited in claim 1, wherein the tunable wavelength transmitter is fixed on one wavelength while the tunable wavelength receiver is tuned for each time-slots according to the at least one reservation map.

18. A media access controller for a network, said media access controller comprising:
   a reservation map unit which creates the at least one reservation map for reserving time slots and wavelengths for transmitting data to and receiving data from a plurality of nodes, made up of the source nodes and destination nodes, based upon available time slots and wavelengths in the network; and
   a demand matrix generating unit for generating a demand matrix based upon the demand data from the plurality of nodes in the network;
   wherein said reservation map is based upon said demand matrix.

19. A media access controller as recited in claim 18, wherein said reservation map is created based upon demand matrix data transmitted from another of said plurality of nodes.

20. A media access controller as recited in claim 18, wherein said demand matrix unit and said reservation map unit are configured for operation with an optical ring network.

21. A media access controller as recited in claim 18, wherein said demand matrix unit and said reservation map unit are configured for operation with optical elements of the optical network connected in a star-coupler topology.

22. A media access controller as recited in claim 18, wherein said demand matrix unit and said reservation map unit are configured for operation with a local area network.

23. A media access controller as recited in claim 18, wherein said reservation map unit is configured to set the reservation map using reservation map data transmitted from another of the plurality of nodes.

24. A method for communicating optical data on an optical network, said method comprising:
   receiving optical data from source nodes at a plurality of source wavelengths at a tunable wavelength receiver;

transmitting optical data to destination nodes at a plurality of destination wavelengths from a tunable wavelength transmitter; and controlling the tunable wavelength receiver and the tunable wavelength transmitter, via a media access controller by scheduling transmission to and receipt from a plurality of nodes at a plurality of time-slots and wavelengths according to at least one reservation map.

25. A method as recited in claim 24, wherein said controlling step further comprises creating the at least one reservation map for reserving time slots and wavelengths for transmitting data to and receiving data from a plurality of nodes, made up of the source nodes and destination nodes, based upon available time slots and wavelengths in the optical network, said reservation map being based upon demand data from the plurality of nodes.

26. A method as recited in claim 25, wherein said controlling step further comprises generating a demand matrix based upon demand data from the plurality of nodes, and wherein said reservation map is based upon said demand matrix.

27. A method as recited in claim 26 wherein said step of creating the at least one reservation map is performed based upon demand matrix data transmitted from another of said plurality of nodes.

28. A method as recited in claim 26, wherein said step of controlling the tunable wavelength receiver and the tunable wavelength transmitter are performed within an optical ring network.

29. A method as recited in claim 26, wherein said step of controlling the tunable wavelength receiver and the tunable wavelength transmitter are performed within optical elements of the optical network connected in a star-coupler topology.

30. A method as recited in claim 26, wherein said step of controlling the tunable wavelength receiver and the tunable wavelength transmitter are performed within a local area network.

31. A method as recited in claim 25, wherein said step of creating the at least one reservation map is configured to set the reservation map using reservation map data transmitted from another of the plurality of nodes.

32. A method as recited in claim 24, wherein said step of receiving optical data is performed to be optimized with other tunable wavelength receivers of other communications nodes of the optical network, such that the tunable wavelength receiver and the other tunable wavelength receivers are tuned to a common wavelength to receive multicast or broadcast transmissions.

33. A method as recited in claim 24, wherein said controlling step further comprises reordering said reservation map when said reservation map is blocked such that the available time slots cannot be allocated without causing a collision.

34. A method as recited in claim 24, further comprising the steps of negotiating an outgoing bandwidth allocation to the destination nodes through an allocator unit and negotiating incoming bandwidth allocations from the source nodes through a requestor unit.

35. A method as recited in claim 34, wherein said step of negotiating an outgoing bandwidth allocation further comprises sending a request to allocate or release bandwidth from the allocator unit in the plurality of nodes, according to bandwidth demand data.

36. A method as recited in claim 35, wherein said step of negotiating an outgoing bandwidth allocation further comprises receiving a request to allocate or release bandwidth from the requestor unit in the plurality of nodes, and allocating or releasing time-slots and wavelengths according to at least one of the request, a request priority and system allocation rules.

37. A method as recited in claim 36, wherein said step of allocating or releasing time-slots is performed according to local bandwidth demand.

38. A method as recited in claim 36, wherein said step of negotiating an outgoing bandwidth allocation further comprises sending acknowledgement for allocating or releasing time-slots to the requestor unit.

39. A method as recited in claim 24, wherein the step of receiving optical data is performed being fixed on one wavelength while the step of transmitting optical data is performed by tuning for each time-slots according to the at least one reservation map.

40. A method as recited in claim 24, wherein the step of transmitting optical data is performed being fixed on one wavelength while the step of receiving optical data is performed by tuning for each time-slots according to the at least one reservation map.

* * * * *